June 27, 1967 B. O. BUELL ET AL 3,328,755
SIGNAL TRANSLATION BY LOWERING APPARENT FREQUENCY
Filed Jan. 4, 1965

INVENTORS
B.O. BUELL
J.P. LINDSEY
BY
Young & Quigg
ATTORNEYS

United States Patent Office 3,328,755
Patented June 27, 1967

3,328,755
SIGNAL TRANSLATION BY LOWERING
APPARENT FREQUENCY
Barry O. Buell and Joe P. Lindsey, Bartlesville, Okla., assignors to Phillips Petroleum Company, a corporation of Delaware
Filed Jan. 4, 1965, Ser. No. 423,207
6 Claims. (Cl. 340—15.5)

This invention relates to the translation of electrical signals by lowering the apparent frequency of the signals.

It is common practice in the geophysical exploration field to create seismic disturbances at or near the surface of the earth and record vibrations which are received by seismometers spaced from the signal source. By comparing a number of recorded signals at different locations, it is possible to obtain information concerning the slopes of subterranean reflecting beds. This procedure is quite valuable in locating structural formations likely to contain oil. However, it is often difficult to analyze the recorded signals either visually or by correlation techniques because of the presence of extraneous vibrations which appear in the records. The presence of a reflection in a seismic recording is thus often difficult to recognize because of the very complex nature of the recording.

In accordance with the present invention, a system is provided for translating seismic signals by lowering the apparent frequency. This simplifies the records so that reflective events can be identified more readily either visually or by the use of known correlation techniques. In a first embodiment of this invention, a signal to be translated is passed through a circuit means which provides two output signals which are proportional to the input signal but which are 90° out of phase with one another. A reference signal from an oscillator is applied through a similar circuit means to provide two additional output signals. Respective first output signals from the two circuit means are multiplied together, as are the respective second output signals from the circuit means. The resultant products are summed to provide a signal which is proportional to the original signal but which has a lower apparent frequency.

In accordance with a second embodiment of this invention, the signal to be translated is transmitted through a circuit means which provides the two output signals previously described. Each of these signals is then squared, and the resulting squared signals are summed to provide an output signal. This output signal is representative of the envelope of the original signal, and thus provides a signal which is less complex in structure.

Accordingly, it is an object of this invention to provide a method of simplifying complex electrical signals by lowering the apparent frequencies of the signals.

Another object is to provide apparatus for use in translating seismic and other electrical signals.

A further object is to provide novel procedures to aid in the interpretation of seismic signals.

Other objects, advantages and features of the invention should become apparent from the following detailed description, taken in conjunction with the accompanying drawing in which.

Figure 1:
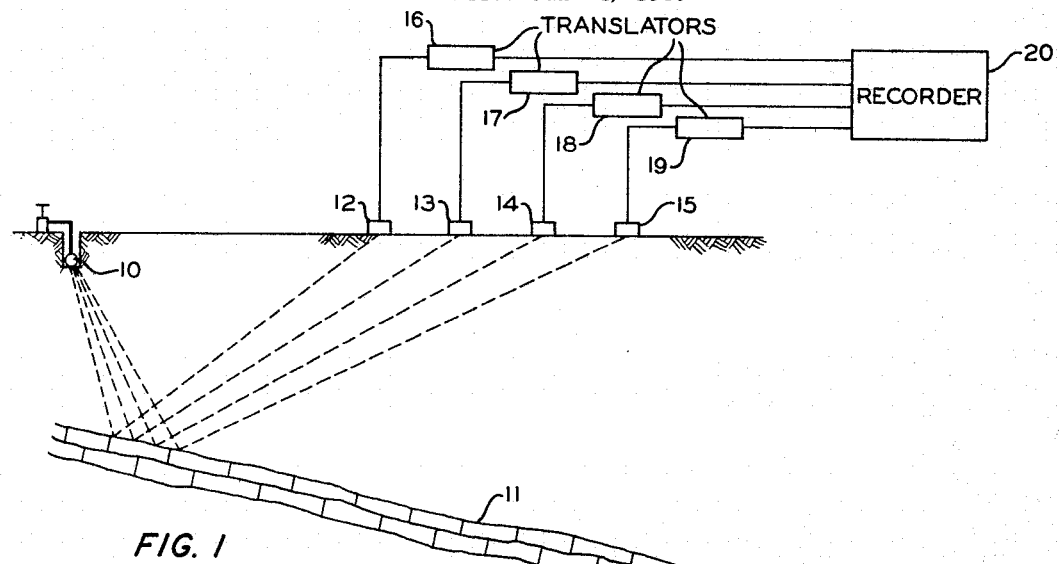
FIGURE 1 is a schematic representation of a typical seismic exploration system having the signal translators of this invention incorporated in the recording circuits.

Referring now to the drawing in detail and to FIGURE 1 in particular, there is shown a seismic exploration system wherein an explosive charge 10 is detonated in a shot hole near the surface of the earth. The resulting vibrations travel downwardly and are reflected back toward the surface from a subterranean reflecting bed 11. These vibrations are received by a plurality of seismometers 12, 13, 14 and 15 which are positioned at the surface of the earth in spaced relationship to the shot hole. The seismometers are conventional devices which establish output electrical signals that are proportional to the vibrations received. The output signals from seismometers 12, 13, 14 and 15 are transmitted through respective translator circuits 16, 17, 18 and 19 to a recorder 20. While only four seismometers have been illustrated, it should be evident that the number of seismometers actually employed is generally much greater, and each illustrated seismometer station can actually represent a group of individual seismometers connected together.

Figure 2:
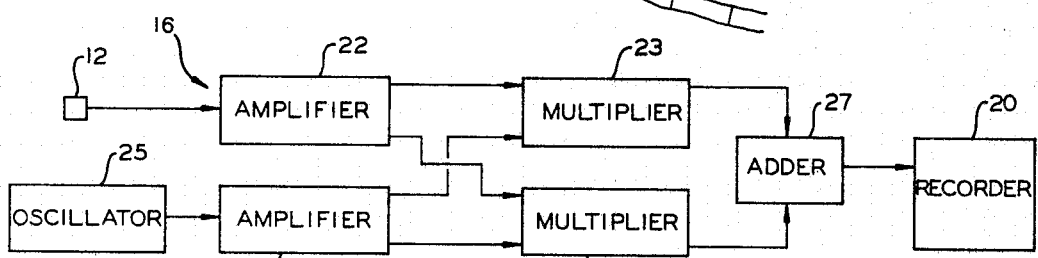
FIGURE 2 is a schematic representation of a first embodiment of the signal translator of this invention.

A first embodiment of one of the signal translators of this invention is illustrated schematically in FIGURE 2. A signal from seismometer 12, for example, is applied to the input of an amplifier 22. This amplifier provides two output signals which are proportional to the input signal, but which are 90° out of phase with one another. These two signals are applied to respective inputs of signal multipliers 23 and 24. An oscillator 25 is employed to provide an output signal which is of generally sinusodial configuration. The frequency of oscillator 25 is selected to be equal to or less than the apparent dominant frequency of the seismic signals being translated, as can be observed on an oscilloscope, for example. In general, seismic signals have apparent dominant frequencies of the order of 100 cycles per second or lower. The output signal from oscillator 25 is applied to the input of a second amplifier 26 which is similar to amplifier 22. The two output signals from amplifier 26 are applied to the respective second inputs of multipliers 23 and 24. The outputs of multipliers 23 and 24 are applied to respective inputs of an adder 27 which sums the two products. The resulting sum is applied to the first channel of recorder 20.

In order to explain the operation of the circuit of FIGURE 2, it will be assumed that the original seismic signal comprises a number of superimposed signals of generally sinusoidal configuration. Any one component of this signal can thus be represented by an expression $\sin \omega_1 t$. The two output signals from amplifier 22 are thus represented by the respective expressions $\sin \omega_1 t$ and $\cos \omega_1 t$. The output signal from oscillator 25 can be represented by the expression $\sin \omega_2 t$, where the frequency $\omega_2$ is less than the frequency $\omega_1$ of the seismic signal. The two output signals from amplifier 26 are thus represented by respective expressions $\sin \omega_2 t$ and $\cos \omega_2 t$. The output signals from multipliers 23 and 24 are represented by the respective quantities $(\sin \omega_1 t \cdot \sin \omega_2 t)$ and $(\cos \omega_1 t \cdot \cos \omega_2 t)$. The output sum from adder 27 is thus equal to $$(\sin \omega_1 t \cdot \sin \omega_2 t + \cos \omega_1 t \cdot \cos \omega_2 t)$$

which can be expressed as $\cos (\omega_1 - \omega_2) t$. Thus, the translated signal contains the same basic information as the original seismic signal except that each frequency has been reduced by the frequency of the signal from oscillator 25. As previously mentioned, this frequency can be any value equal to or less than the apparent frequency of the original seismic signal.

Figure 3:
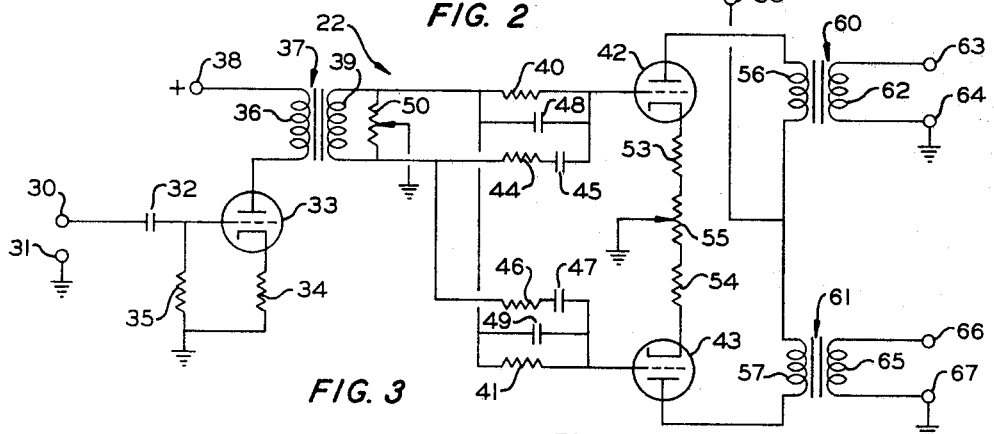
FIGURE 3 is a schematic circuit drawing of an amplifier which is suitable for use in the circuit of FIGURE 2.

A suitable circuit for use as the amplifiers in FIGURE 2 is illustrated schematically in FIGURE 3. This circuit is provided with input terminals 30 and 31, the latter being connected to ground. Terminal 30 is connected through a capacitor 32 to the control grid of a vacuum tube 33. The cathode and control grid of tube 33 are connected to ground by respective resistors 34 and 35. The anode of tube 33 is connected through the primary winding 36 of a transformer 37 to a positive terminal 38. The first end terminal of the secondary winding 39 of transformer 37 is connected through respective resistors 40 and 41 to the control grids of vacuum tubes 42 and 43, respectively. The second end terminal of transformer winding 39 is connected through a resistor 44 and a capacitor 45 to the control grid of tube 42, and through a resistor 46 and a capacitor 47 to the control grid of tube 43. Capacitors 48 and 49 are connected in parallel with respective resistors 40 and 41. A potentiometer 50, having a grounded contactor, is connected across transformer winding 39.

The input signal is thus amplified by tube 33 and applied to the primary of transformer 37. The filter networks connected between the secondary of transformer 37 and respective tubes 42 and 43 are designated so that the two transmitted signals are 90° out of phase with one another over the frequency range of interest.

The cathodes of tubes 42 and 43 are connected through respective resistors 53 and 54 to the end terminals of a potentiometer 55, the contactor of which is connected to ground. The anodes of tubes 42 and 43 are connected through respective transformer windings 56 and 57 to a terminal 58 which is maintained at a positive potential. Transformer windings 56 and 57 constitute the input windings of respective transformers 60 and 61. The secondary winding 62 of transformer 60 is connected to output terminals 63 and 64, the latter being connected to ground. The secondary winding 65 of transformer 61 is connected to output terminals 66 and 67, the latter being connected to ground.

It should thus be apparent that two output signals are provided by the amplifier, and that these signals are 90° out of phase with one another. In one specific embodiment of the amplifier of FIGURE 3, the following circuit component values are employed.

| Component: | | Value |
|---|---|---|
| 34 | ohms | 620 |
| 35 | do | 100,000 |
| 50 | do | 500 |
| 40 | do | 133,300 |
| 44 | do | 100,000 |
| 41 | do | 133,300 |
| 46 | do | 100,000 |
| 53 | do | 270 |
| 54 | do | 270 |
| 55 | do | 270 |
| 32 | microfarad | 0.1 |
| 45 | do | 0.0972 |
| 48 | do | 0.0486 |
| 47 | do | 0.0243 |
| 49 | do | 0.01215 |

Figure 4:
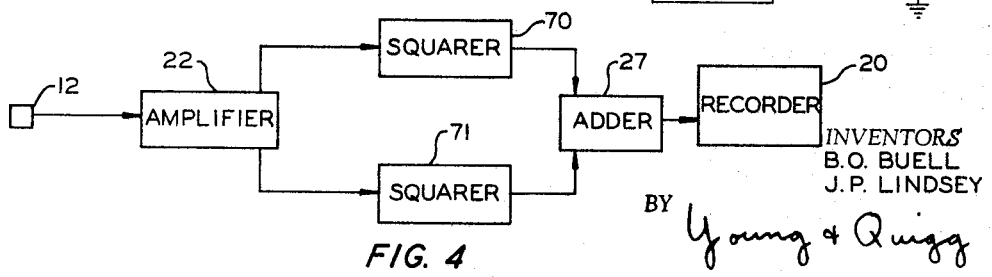
FIGURE 4 is a schematic drawing of a second embodiment of the signal translator of this invention.

A second embodiment of the signal translating circuit of this invention is illustrated schematically in FIGURE 4. The output signal from seismometer 12, for example, is again applied to the input of amplifier 22. The two output signals from amplifier 22 are applied to the input of respective squaring circuits 70 and 71. Each of these circuits provides an output signal which is representative of the square of the input signal. The squared output signals from squarers 70 and 71 are applied to the input of an adder 27, the output of which is applied to recorder 20. The circuit of FIGURE 4 is less complex than the circuit of FIGURE 2 and provides an output signal which is representative of the envelope of the original seismic signal. In order to explain this operation, it will be assumed that the input signal is representative of the quantity $f(t) \sin \omega_1 t$. The two output signals from squarers 70 and 71 can be represented by the expressions $[f(t) \sin \omega_1 t]^2$ and $[f(t) \cos \omega_1 t]^2$. Thus, the resulting sum is representative of $f^2(t)$, which in turn represents the envelope of the original signal.

In accordance with both of the foregoing procedures, the original seismic signals have been simplified without destroying any of the basic information patterns of interest. These simplified signals can more readily be used in further interpretation methods well known in the art.

While the invention has been described in conjunction with presently preferred embodiments, it obviously is not limited thereto.

What is claimed is:

1. Apparatus adapted for use in translating electrical signals comprising first and second circuit means, each constructed to provide, when supplied with an input signal, two output signals which are proportional to the input signal and which are 90° out of phase with one another, said first circuit means being adapted to receive an electrical signal to be translated; an oscillator; means applying the output signal of said oscillator to the input of said second circuit means; first and second signal multipliers; means applying the first output signal of said first circuit means to the first input of said first multiplier; means applying the second output signal of said first circuit means to the first input of said second multiplier; means applying the first output signal of said second circuit means to the second input of said first multiplier; means applying the second output signal of said second circuit means to the second input of said second multiplier; signal adding means; and means applying the outputs of said multipliers to the respective inputs of said signal adding means, the output of said signal adding means being the translated signal.

2. The apparatus of claim 1 wherein said first and second circuit means each comprises a band pass amplifier with first and second channels, each channel being tuned to pass common frequencies and to provide respective output signals which are 90° out of phase with one another when a common input signal is applied to the two channels.

3. Seismic signal interpretation apparatus comprising a seismometer adapted to provide an output signal representative of vibrations incident thereon; first and second circuit means, each constructed to provide, when supplied with an input signal, two output signals which are proportional to the input signal and which are 90° out of phase with one another; means applying the output signal from said seismometer to the input of said first circuit means; an oscillator; means applying the output signal of said oscillator to the input of said second circuit means; first and second signal multipliers; means applying the first output signal of said first circuit means to the first input of said first multiplier; means applying the second output signal of said first circuit means to the first input of said second multiplier; means applying the first output signal of said second circuit means to the second input of said first multiplier; means applying the second output signal of said second circuit means to the second input of said second multiplier; signal adding means; and means applying the outputs of said multipliers to the respective inputs of said signal adding means.

4. Apparatus for use in translating electrical signals comprising circuit means constructed to provide, when supplied with an input signal, two output signals which are proportional to the input signal and which are 90° out of phase with one another, said circuit means being adapted to receive an electrical signal to be translated; first and second signal squaring means; means to apply the first output of said circuit means to the input of said first squaring means; means to apply the second output of said circuit means to the input of said second squaring means; signal adding means; and means to apply the outputs of said squaring means to the respective inputs of said adding means, the output of said adding means being the translated signal.

5. Seismic signal interpretation apparatus comprising a seismometer adapted to provide an output signal representative of vibrations incident thereon; circuit means constructed to provide, when supplied with an input signal, two output signals which are proportional to the input signal and which are 90° out of phase with one another; means applying the output signal from said seismometer to the input of said circuit means; first and second signal squaring means; means to apply the first output of said circuit means to the input of said first squaring means; means to apply the second output of said circuit means to the input of said second squaring means; signal adding means; and means to apply the outputs of said squaring means to the respective inputs of said adding means.

6. Apparatus for use in translating electrical signals comprising band pass amplifying means having first and second channels which are tuned to pass common frequencies and to provide, when a common input signal is applied to both channels, two output signals which are proportional to the input signal and which are 90° out of phase with one another; first and second signal squaring means; means to apply the first output signal of said amplifying means to the input of said first squaring means; means to apply the second output signal of said amplifying means to the input of said second squaring means; signal adding means; and means to apply the outputs of said squaring means to the respective inputs of said adding means, the output of said adding means being the translated signal.

References Cited

UNITED STATES PATENTS

| | | | |
|---|---|---|---|
| 2,871,461 | 1/1959 | Lee | 340—15.5 |
| 2,900,137 | 8/1959 | Giser. | |
| 2,989,135 | 6/1961 | Pierce et al. | 340—15.5 X |
| 3,219,938 | 11/1965 | Greening | 328—133 |

BENJAMIN A. BORCHELT, *Primary Examiner.*

R. M. SKOLNIK, *Assistant Examiner.*